United States Patent [19]

Numakura et al.

[11] Patent Number: 5,371,616
[45] Date of Patent: Dec. 6, 1994

[54] TONAL CONVERSION METHOD OF A PICTURE

[75] Inventors: Takashi Numakura; Iwao Numakura, both of Tama, Japan

[73] Assignee: Yamatoya & Co., Ltd., Tokyo, Japan

[21] Appl. No.: 47,456

[22] Filed: Apr. 19, 1993

[30] Foreign Application Priority Data

Jan. 22, 1993 [JP] Japan ................. 5-026025

[51] Int. Cl.$^5$ ............................................. H04N 1/46
[52] U.S. Cl. ................................. 358/534; 358/523; 358/501; 358/456; 358/298
[58] Field of Search ............... 358/534, 530, 523, 518, 358/515, 500, 524, 298, 456, 453, 465, 448, 501; 382/50

[56] References Cited

U.S. PATENT DOCUMENTS

5,072,305 12/1991 Numakura et al. ................. 358/456

Primary Examiner—Edward L. Coles, Sr.
Assistant Examiner—Fan Lee
Attorney, Agent, or Firm—Wenderoth, Lind & Ponack

[57] ABSTRACT

A tonal is carried out to produce a reproduced picture of a halftone from a color photographic original picture of a continuous tone. Density values of a designated highlight area (H) and an area in the vicinity thereof on the color photographic original picture are measured and density values of a designated shadow area (S) and an area in the vicinity thereof on the color photographic original picture are measured to obtain respective representative density values ($DH_{av}$, $DS_{av}$) from the measured density value. Also, measuring density values ($D_n$) of pixels of a range extending from the highlight area (H) to the shadow area (S) are measured. Using a density characteristic curve of a photosensitive material of a color film with which the color photographic original was taken, the density characteristic curves being defined in a D-X orthogonal coordinate system of which vertical axis (i.e., D axis) represents density values and of which horizontal axis (i.e., X axis) represents picture information values correlating with light intensity, the representative density values ($DH_{av}$, $DS_{av}$) and density values ($D_n$) of the pixels are converted into picture information values ($X_n$) correlating with light intensity. The picture information values ($X_n$) correlating with light intensity into tonal intensity are then converted values of the reproduced picture (y) by conducting a specific tonal conversion formula.

4 Claims, 3 Drawing Sheets

TONAL CONVERSION METHOD OF A PICTURE

BACKGROUND OF THE INVENTION

The present invention relates to a method for converting a tone of a picture made use in plate-making process for producing reproduced pictures such as printed pictures, various pictorial hard copies of high quality. This invention is, more specifically, concerned with a novel tonal conversion method for a picture employed when a reproduced picture of a half tone is produced from a color photographic picture of a continuous tone as an original picture.

It is a matter of course that when a color photographic picture in a continuous tone is used as an original picture to make a reproduced picture such as a printed picture by using a color scanner as a plate-making device or to output a pictorial hard copy of a high quality by using a scanner or a high-performance printer, the continuous tone of the original picture should be converted into a halftone expressing a reproduced picture.

A term "tonal conversion of a picture" mentioned above means that density information of each pixel of an original picture is converted into density information of a reproduced picture system.

There have been known in a field of production of a reproduced picture various reproducing techniques (i.e., density representing techniques) to reproduce the density information of an original on a reproduced picture, in any one of which the tone of the original picture is converted.

The tonal conversion closely relates to conversion of density information of pixels along with conversion of color tone of pixels. The detail of this will be stated later.

Typical techniques employed currently to represent density of a reproduced picture are as follows:

(a) Typically used to produce printed pictures. A covering rate of a given pixel is changed according to a size of a dot (as called "dot area % value"). Namely, a covering rate of a given pixel is changed by varying a size of a dot to reproduce the density information of an original picture on a printed picture.

This technique is referred "a multiple valued dot area tonal representation", applied to ink jet printers, thermally molten transfer printers (thermal printers), and the like, in addition to a printed picture producing device.

(b) There is another technique where a covering rate of a given pixel is changed by changing an arrangement of dots of the same size, as contrasted with the above multiple valued dot area technique where a size of a dot is changed. This technique is called "binary valued dot area tonal conversion representation", applied in the same field such as thermally molten transfer printers, ink jet printers, and the like.

(c) There is still another technique where the density of a pixel of a given size is changed. This is based on the same principle as the reproducing system of a continuous density seen in general photographic materials. This technique is referred "a direct density tonal representation", applied in sublimation type thermal transfer printers (sublimation type printers) and the like.

As stated above, various reproducing techniques are used to produce reproduced pictures such as printed pictures, hard copies outputted from a high-performance printers and the like from original pictures of a continuous tone. Incidentally, a term "reproduced picture" referred in this invention should be interpreted in the broadest sense including printed pictures and outputted hard copies of a high-performance printer. It is a material subject in such techniques to faithfully reproduce, gradation and color tone of an original picture in a reproduced picture, with operational regularlity.

It is, however, the present condition that the subject relating to reproducibility, mentioned above, cannot be rationally overcome in spite of recent remarkable improvements in the filed of picture reproduction.

The main cause of the present condition lies in that, in a technique to faithfully reproduce a tone (including gradation and color tone) of an original picture on a reproduced picture or in a technique to control (correct or alternate) the tone of an original picture, a tone nonlinearly converting and processing technique (i.e., a tonal conversion technique of a picture or a tonal conversion method of a picture) applied relating to a density area of a picture lacks theory, thus being non-scientific and irrational, although the technique must be basic.

This point will be next described in detail by way of description of a processing technique of a printed picture, which is a typical example in a field of production of reproducing pictures.

Inventors of the present invention have an opinion that knowledge accumulated in the field of plate-making and printing have not been taken full advantages of in current plate-making systems and equipments highly developed such as monochrome scanners, color scanners and the like, a technique to design such highly developed equipment has been founded on the color-separation theory based on a photographic masking method that is non-systematic, and various improvements often made on the systems and equipments have been merely a symptomatic treatment based on the color-separation theory.

In the conventional design technique of a scanner system, color compensation and color correction (color masking) are considered to be primary and tone adjustment of a picture is considered to be secondary when a photographic original in a continuous tone is converted into a printed reproduced picture in a halftone through a color-separation work. As a result, the present technology fails to accomplish high stability and high reproducibility of picture quality when producing a printed pictures.

As stated, there has not been found any appropriate measure to correlate a density value of a given sample point (i.e., a pixel point) in a picture of a continuous tone to a dot area % value of a dot corresponding to the given sample point on a reproduced picture of a halftone, using the conventional tonal conversion technique used to convert a picture of a continuous tone into a picture of a halftone.

From a standpoint that a technique enabling rational tonal conversion relating to density of each pixel of a picture should be considered to be primary rather than an improvement of two important technical elements, that is, a gradation control technique and a color correction technique, in order to rationally produce a printed picture, the inventors of this invention have been making an aggressive research to do away with a limitation lying in the non-rational, non-scientific conventional tonal conversion techniques.

As a result of the research, the inventors have proposed a novel tonal conversion method in which a basic density value of a given sample point on a picture of a continuous tone is correlated with a dot area % value of a point corresponding to the given sample point on a reproduced picture of a halftone. It has been found that the novel tonal conversion method that is rational and scientific is not only applicable to the conventional plate-making systems and equipments, but also is able to get rid of the limitation lying in the conventional color-separation techniques and to exhibit an excellent effect. The details of the preceding tonal conversion method having been proposed by the inventors are disclosed in specifications of Japanese Patent Laid-Open Publication No. HEI 3-3477 of Patent Application No. HEI 1-135825 (corresponding to U.S. Patent application Ser. No. 07/481,054 and the following U.S. Patent Application) and Japanese Patent Application No. HEI 2-55204 (corresponding to U.S. Patent No. 5,072,305).

The tonal conversion methods which has been proposed by the inventors employ a specific tonal conversion formula analogous with a tonal conversion formula according to the present invention, when used upon converting a tone of a picture, (but, the operational conditions therebetween are quite different from each other, as will be described later.) The preceding tonal conversion methods admit of improvement in order to produce with higher reproducibility a printed picture of a superior quality.

The preceding tonal conversion methods are considered to be insufficient in some points that a constant in the preceding tonal conversion formula needs to be determined from density values measured in a highlight area (H) and a shadow area (S) in order to operate the tonal conversion formula, besides the density values in H and S area are measured unavoidably with variations, more or less. To overcome the above problem is necessary to produce a printed picture of an excellent quality with high reproducibility, as desired.

From the above, it will be appreciated that the problem lying in the preceding tonal conversion method of a picture by the inventors exists commonly in a field of production of general reproduced pictures, although the above description has been made by way of the field of production of printed pictures.

An object of the present invention is therefore to provide a novel tonal conversion method of a picture, applicable to a field of production of various reproduced pictures.

More specifically, it is common that picture information (i.e., density information) is obtained from an original picture and the obtained picture information is converted by means of a tone converting part (i.e., a tone converter) in a reproduced picture producing system. The tonal conversion method of this invention is intended to be applied in the above process so as to carry out the tone conversion work rationally.

In particular, according to the present invention, an effect due to variations unavoidably occurring in density values measured in the H and S areas designated respectively on a color photographic original picture may be recognizably reduced. The density information free from such variations is used to produced a reproduced picture of a superior quality with high reproducibility as desired by operating a specific tonal conversion formula proposed in this invention.

SUMMARY OF THE INVENTION

The present invention provides a method for converting a tone of a picture to produce a reproduced picture in a halftone from a color photographic original picture in a continuous tone comprising the steps of:

measuring density values of a highlight area (H) and an area in the vicinity thereof assigned in the color photographic original picture and density values of a shadow area (S) and an area in the vicinity thereof also assigned in the color photographic original picture to obtain respective representative density values ($DH_{av}$, $DS_{av}$) from the measured density values;

measuring density values ($D_n$) of pixels of a range from the highlight area (H) to the shadow area (S) by scanning;

using a density characteristic curves of a photosensitive material of a color film with which the color photographic original was taken, the density characteristic curves are defined in a D-X orthogonal coordinate system of which vertical axis (i.e., D axis) represents density values and of which horizontal axis (i.e., X axis) represents picture information values correlating with light intensity, converting the representative density values ($DH_{av}$, $DS_{av}$) and density values ($D_n$) of the pixels into picture information values ($X_n$) correlating with light intensity; and converting the picture information values (Xn) correlating with light intensity into tonal intensity values (y) conducting a tonal conversion formula:

$$y = y_H + [\alpha(1-10^{-k \cdot x})/(\alpha-\beta)] \cdot (y_s - y_H)$$

where

X: a basic light intensity value shown by $X=(X_n-X_H)$, that is, a difference between a picture information value ($X_n$) correlating to light intensity, which is obtained from a density value ($D_n$) of an arbitrary pixel (n point) through the density characteristic curve defined in the D-X orthogonal coordinate system and picture information values ($X_H$) correlating with light intensity corresponding to a representative density value ($DH_{av}$) of the highlight area (H);

y: a tonal intensity value of a pixel in a reproduced picture, corresponding to an arbitrary pixel in the original picture;

$y_H$: a tonal intensity value priory set to a highlight area (H) in the reproduced picture corresponding to the highlight area (H) in the original picture;

$y_S$: a tonal intensity value priory set to a shadow area (S) in the reproduced picture corresponding to the shadow area (S) in the original picture;

α: a surface reflectance of a recording paper on which the reproduced picture is expressed;

β: a numerical value determined from $\beta=10^{-\gamma}$;

k: a numerical value determined from $k=\gamma/(X_s-X_H)$, wherein Xs is a picture information value correlating with light intensity, obtained from the representative density value ($DS_{av}$) of the shadow area (S) through the density characteristic curve defined in the D-X orthogonal coordinate system; and γ: an arbitrary coefficient.

When a reproduced picture of a halftone is produced from a color photographic original of a continuous tone by means of a color scanner, which is typically used to produce a printed pictures, or an image scanner, which is used to produce another type of reproducing pictures of a high quality, it is extremely difficult to produce a reproduced picture having tonal intensity values (i.e., dot area % values, covering rate of pixels by dots, and the like) over the whole dynamic range from a highlight area (H) to a shadow area (S), as intended.

in other words, it is very difficult to carry out the tonal conversion as designed so as to stably and efficiently produce desired reproduced pictures.

The tonal conversion method of a picture according to this invention is to rationally control the tonal conversion process conducting a specific tonal conversion formula. When carrying out the tonal conversion, density values of a highlight area (H) and a shadow area (S) of an original picture are measured to set initial conditions for the tonal conversion.

However, the density values of the highlight and shadow areas (H, S) of an original picture are measured unavoidably with variations, more or less. It is quantatively grasped from results of a number of experiments that such variations exert an inverse effect to a resulting reproduced picture. The variations yields a difference closely 10% in tonal intensity values in a range from a highlight to a middle, which range is important to reproduce a tone. That leads to a noticeable effect to vision of a man.

In order to produce a reproduced picture of a high quality applying the tonal conversion method of this invention, it is necessary to incorporate a density measuring part in a conventional picture reproducing system, adapted to average variations of density values measured in a highlight area (H) and a shadow area (S) of an original picture to obtain an average density value, along with a tone converting part adapted to perform the tone conversion conducting the tonal conversion formula of this invention, thereby constantly producing a reproduced picture as intended.

The tonal conversion method of this invention contributes to an improvement in efficiency of plate-making work, that is, decreasing the number of spoiled plates or preventing occurrence of spoiled pates, saving materials, reducing working hours of the workers or operators, enabling early delivery of products, etc. in, for example, the field of production of printed pictures.

Since the tonal conversion is carried out rationally and quantatively upon producing a printed picture, the tonal conversion method is helpful when operators engaging color separation work (i.e., tonal conversion and color separation works, the later including color correction work) are trained and educated scientifically and quantatively, and is effective to meet to customers' requirements.

The tonal conversion method is, of course, not limited to a field of production of printed pictures, applicable to a field of production of other reproduced pictures.

BRIEF DESCRIPTION OF THE DRAWINGS

The present invention will now be described in detail with reference to the accompanying drawings in which.

DESCRIPTION OF THE INVENTION

The present invention will be hereinafter described in detail.

The tonal conversion method according to the present invention will be described by way of a producing process of a color printed pictures as a reproduced picture, particularly by means of a color scanner.

The above example is only for illustration, it should be appreciated that the present invention is not limited only to the above example.

Primarily, the tonal conversion method, or setting of tonal conversion curves, more concretely, will be now illustrated for understanding of this invention. The tonal conversion method, that is the setting of a tonal conversion curves (color-separation curves) practically, employs picture information that is an object in the tonal conversion of a picture. The picture information is understood to be picture information values correlating to light intensity (hereinafter simply called "light intensity", a reason of which will be described later), which is a material concept in this invention.

As stated, the inventors have been conducting aggressive research to accomplish a technique for rationally setting tonal conversion curves (i.e., color-separation curves, tone reproducing curves), which are a core in the color separation work. A color-separation curve for C plate, which is a base when another plates (C, M and Y plates) are produced, is defined in relation of density values obtained through a red filter which is in a complementary relation with the C plate, with dot area % values. Through the research made by the inventors, it has been found that, instead of the above conventional technique, a density value is converted into a light exposure value (hereinafter called "light intensity value" because it is considered to be included in a concept of light intensity value in this invention) via photographic density characteristic curves of a photosensitive material of a color film in which an original picture has been taken, and a color-separation curve is set, which is defined in relation of the light intensity values with the dot area % values, whereby a printed picture with a good tonal characteristic may be produced from any original picture of various picture quantities (such as, for example, under- or over-exposed, high- or low-key, which are extremely difficult to be reproduced, color fogged, faded, etc.) irrespective to the picture quantity of the original (disclosed in a specification of Japanese Patent Application No. HEI 1-135825, for example).

The conventional color separation curves for the respective color plates, which are defined in relation of the density values with the dot area % values are herein referred as "D axis color separation curves" since picture information obtained from density represented by a characteristic curve of a photographic photosensitive material plotted along the vertical axis of an orthogonal coordinates is considered to be important, while the color separation curves according to the present invention are referred as "X axis color separation curves" since the picture information obtained from light intensity represented by the characteristic curve of the photographic photosensitive material plotted along the X axis is considered to be important.

Instead of density values, light intensity values are used as picture information utilized in the tonal conversion process in this invention in order to produce a printed picture of a good picture quality from an original picture whichever the original is over-, normal- or under-exposed, of high- or low-key, color-fogged, or faded, irrespective to the picture quality of the original. This is quite different from the conventional techniques.

A reason for employing "light intensity value" of an original picture upon conversion of the tone (conversion from a continuous tone into a halftone) instead of "density value" is as follows:

In order to rationally convert the tone of various original pictures having different picture qualities, it is necessary to utilize light intensity values of an object (which is literally a base of an original picture, i.e., a real image or a real scene) incident into a photosensitive materials of a color film, not utilizing density values that have been effected by a photographic density characteristic curves inherent in the respective photosensitive materials. Since the light intensity values are picture information independent of an effect of the photographic density characteristic curves (i.e., characteristics of the photographic photosensitive materials), any original picture having a different picture quality may be converted in tone rationally and uniformly. That is the inventors' opinion.

Next description will be how to set an X axis color-separation curve for a plate, for example C plate, utilizing light intensity values.

At first, obtaining light intensity values as picture information from a color photographic original.

The light intensity values may be readily obtained from photographic density through a characteristic curve, namely a photographic characteristic curve so called, of a photosensitive material (i.e., photosensitive emulsion) included in a color film in which an original picture has been taken. The photographic characteristic curve is plotted in a D-X orthogonal coordinate system, along a vertical axis of which density D is represented and along a horizontal axis of which light exposure X is represented.

To determine the light intensity values, it is necessary to express the photographic characteristic curve of a photographic photosensitive material of a color film by functional equations. A light intensity value $X_n$ may be determined from a density value $D_n$ of a pixel (n point) arbitrarily selected in the original picture, operating the functional equations. The photographic characteristic curve to be expressed by the functional equations is exhibited as technical data by a manufacturer of the film.

Figure 1:
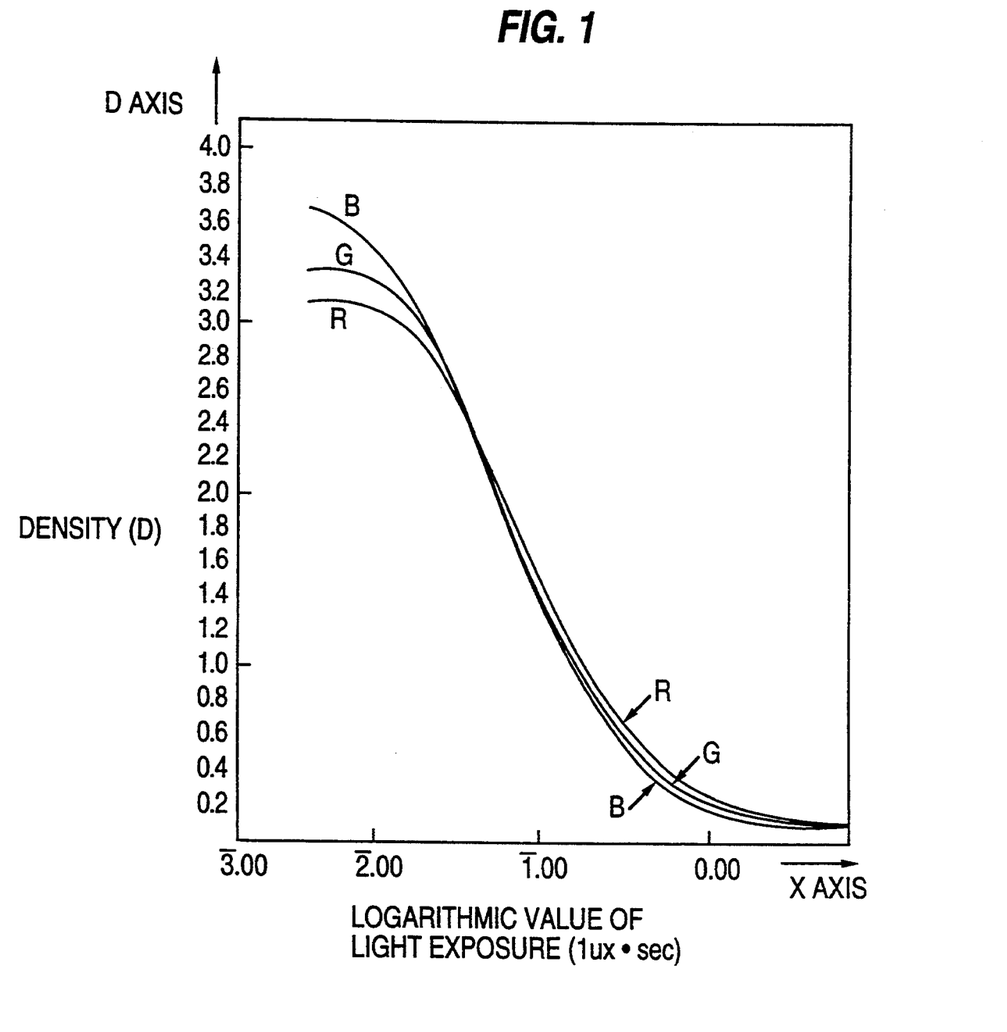
FIG. 1 is a graph showing a photographic characteristic curves R, G and B of photosensitive materials contained in a color film.

FIG. 1 shows photographic characteristic curves for the respective color of a film; Echtachrome 64 (tradename), Professional (daylight) manufactured by Eastman Kodak.

There is no limitation on how to express the photographic characteristic curves by the functional equations. Any fashion is applicable as desired. As shown in FIG. 1, photosensitive emulsions for R, G and B layers of the color film have respective characteristic curves. Therefore, it is indispensable to express the respective characteristic curves by the equations to determine light intensity values in order to produce respective color plates.

TABLE 1 shows equations expressing the respective characteristic curves of the film to determine the light intensity values. Incidentally, TABLE 1 has a plurality of sections so that the photographic characteristic curves may be expressed by the equations as accurately as possible.

TABLE 1

FORMULAE OF
PHOTOGRAPHIC DENSITY CHARACTERISTIC CURVES
Formlae to convert color original density (D)
into X axis values (X)

| Emulsion layer | No. | D | X |
|---|---|---|---|
| R | 1 | 0.1444–0.8000 | $X = \log\{(D-0.0756) + 0.05158\}$ |
|   | 2 | 0.8000–1.0000 | $X = 1.1475 + 0.7000(D-0.8000)$ |
|   | 3 | 1.0000–1.2000 | $X = 1.2873 + 0.6000(D-1.0000)$ |
|   | 4 | 1.2000–1.4000 | $X = 1.4075 + 0.3250(D-1.2000)$ |
|   | 5 | 1.4000–2.2000 | $X = 1.5125 + 0.3000(D-1.4000)$ |
|   | 6 | 2.2000–2.6000 | $X = 1.9125 + 0.5125(D-2.2000)$ |
|   | 7 | 2.6000–2.8000 | $X = 2.1175 + 0.7125(D-2.6000)$ |
|   | 8 | 2.8000–3.175 | $X = 1.15 + e^{(1/100) \cdot 10 (D-2.2638) \div 0.4455}$ |
| G | 1 | 0.1444–0.8000 | $X = \log\{(D-0.0841) \div 0.04517\}$ |
|   | 2 | 0.8000–1.0000 | $X = 1.2000 + 0.7500(D-0.8000)$ |
|   | 3 | 1.0000–1.4000 | $X = 1.3500 + 0.5825(D-1.0000)$ |
|   | 4 | 1.4000–1.8000 | $X = 1.5760 + 0.50825(D-1.4000)$ |
|   | 5 | 1.8000–2.6000 | $X = 1.7775 + 0.4250(D-1.8000)$ |
|   | 6 | 2.6000–2.8000 | $X = 2.1175 + 0.4125(D-2.6000)$ |
|   | 7 | 2.8000–3.0000 | $X = 2.2000 + 0.8375(D-2.8000)$ |
|   | 8 | 3.000–3.2178 | $X = 1.2275 + e^{(1/100) \cdot 10 (D-2.7035)} + 0.3028$ |
| B | 1 | 0.1333–0.8000 | $X = \log\{(D-0.0758) \div 0.43141\}$ |
|   | 2 | 0.8000–1.0000 | $X = 1.2250 + 0.625(D-0.8000)$ |
|   | 3 | 1.0000–1.4000 | $X = 1.3500 + 0.5625(D-1.0000)$ |
|   | 4 | 1.4000–1.8000 | $X = 1.5750 + 0.30825(D-1.4000)$ |
|   | 5 | 1.8000–2.6000 | $X = 1.7775 + 0.4250(D-1.8000)$ |
|   | 6 | 2.6000–2.8000 | $X = 2.1175 + 0.4125(D-2.6000)$ |
|   | 7 | 2.8000–3.0000 | $X = 2.2000 + 0.3250(D-2.8000)$ |
|   | 8 | 3.0000–3.2000 | $X = 2.3050 + 0.5375(D-3.0000)$ |
|   | 9 | 3.2000–3.4000 | $X = 2.4125 + 0.5765(D-3.2000)$ |
|   | 10 | 3.4000–3.6000 | $X = 2.3278 + 1.7380(D-3.4000)$ |

When expressing the photographic characteristic curves by the equations as shown in FIG. 1, there was an assumption that a scale of the D axis representing the density values of the color photographic original is the same as that of the X axis representing the light intensity values given by logE of an object (or an real picture).

The scaling of the D and X axes herein adopted is considered to be rational from the following viewpoint.

In a photographic characteristic curve, a logarithmic value ($\log E = \log I \times t$) of a light exposure E is positioned along the X axis. A man evaluates a physical quantity of the light exposure E with an ability of a visual sense to logarithmically discriminate brightness. A physical quantity relating to density represented along the D axis is also logarithmically evaluated by the visual sense of a man. From these, there occurs no inconvenience if the D axis is correlated with the X axis on the same scale.

As the scaling above is for the sake of convenience, it is, of course, not limited to this scaling. The photographic characteristic curve may be expressed on the basis of a relationship between numerical values on the D axis with those on the X axis, for instance. In this invention, a physical quantity represented along the X axis is referred as "light intensity value" that has a concept including a light exposure.

As stated, the tonal conversion of a picture according to the invention is performed on the basis of picture information given by a camera object (i.e., a real picture or a real scene), that is, a light intensity value ($X_n$) represented along the X axis, not on a basis of a density value ($D_n$) of a color photographic original.

A value $X_n$ may be readily determined from a value $D_n$ through calculation of a functional equation $X=F(D)$ expressing a photographic characteristic curve where the $D_n$ is correlated with $X_n$, as shown in Table 1.

The value $X_n$ given by a camera object (i.e., real picture) may be obtained, as in the above manner. The next step is to set a color separation curve based on the X axis, where light intensity values are put stress on, by using the $X_n$ value rationally determined and the specific tonal conversion formula mentioned hereinbefore, instead of setting a color separation curve based on the D axis where density values are put stress on. First, from a density value ($D_n$) of a given pixel (n point) in a color photographic original, a light intensity value ($X_n$) of a pixel on a camera object (i.e., a real picture), corresponding to the given pixel (n point) in the color photographic original, is determined via a photographic characteristic curve. The respective light intensity values ($X_n$) obtained are then substituted in the specific tonal conversion formula to determine respective dot area % values as tonal intensity values, thereby setting an X axis color separation curve.

The specific tonal conversion formula is operated, using light intensity values ($X_H$, $X_S$) corresponding to a highlight area (H) and a shadow area (S), respectively, both areas being assigned on the original picture.

An essential theme of this invention is to recognize the variations unavoidably occurring in measurement of the density values in a highlight area (H) and a shadow area (S) and to overcome the problem due to such variations. This will be described later in detail.

The light intensity values ($X_n$) needs to be converted into a basic light intensity values (X) in prior when operating the specific tonal conversion formula to determine dot area % values ($Y_H$, $Y_S$) that will be set to the H and S areas. A dot generator of a color scanner is then operated according to the X axis color separation curve for C plate to fabricate a C plate of a halftone.

Derived process and feature of the specific tonal conversion formula will be next described in brief.

The tonal conversion formula is used to determine a value (y) of dot area % set to a pixel of an original picture upon producing a printed picture of a halftone. The tonal conversion formula has been derived from a density formula (photographic density, optical density) that is generally admitted:

$$D = \log Io/I = \log 1/T$$

where
- Io: incident light intensity;
- I: reflected light intensity or transmitted light intensity; and
- T=I/Io: reflectance or transmittance.

When the general density formula relating to density D is applied to the plate-making and printing process, density (D') in the plate-making and printing process = $\log Io/I$ = log(unit area x reflectance of a paper)/{(unit area−dot area) x reflectance of a paper+dot area×surface reflectance of an ink} = $\log \alpha A/[\alpha\{A-(d_1+d_2+\ldots d_n)\}+\beta(d_1+d_2\ldots d_n)]$ where
- A: unit area;
- $d_n$: a dot area in the unit area;
- $\alpha$: reflectance of a printing paper; and
- $\beta$: surface reflectance of a printing ink.

On the basis of the above density formula (D') for the plate-making and printing process and on an assumption that light intensity values, not density values, are used as picture information, the specific tonal conversion formula employed in this invention has been derived so as to coincide a measured value with a theoretical value in a correlation of a basic light intensity value (X) of a sample point (n point) in an original picture of a continuous tone which a value (y) of a dot area % of the sample point in a printed picture of a halftone corresponding to the sample point (n point) in the original picture.

When operating the tonal conversion formula, parameters of $Y_H$ and $Y_S$ are generally treated as constants. For example, 5% of dot area % value is set to $y_{CH}$ for C plate, 95% to $y_{CS}$ for C plate, 3% to $y_{MH} = y_{YH}$ for M and Y plates and 90% to $y_{MS}=y_{YS}$ for the M and Y plates. If employing an $X_n$ determined in association with a value $D_n$ measured with a densitometer and percent values of $y_H$ and $y_s$ in the tonal conversion formula, a y value will be resulted in as a percent value in the calculation.

It is assumed that a value of a parameter $\gamma$, which is considered to be also important, is generally treated as a constant when setting a color separation curve for C plate by operating the tonal conversion formula. Therefore, the $\gamma$ value may be fixed to 0.45. This treatment has been brought from a process of the derivation and development of the tonal conversion formula employing a density value as picture information and validity of this treatment has been proved in a number of experiments.

The parameter $\gamma$ plays an important role since it can change a configuration of the color separation curve as intended, in other words, it can produce a printed picture having a desirable tonal characteristic by varying the $\gamma$ value as intended. It is therefore possible to set another value to the parameter $\gamma$.

The parameter $\gamma$ in the tonal conversion formula of this invention is set to a different value, depending on when a tone of a given camera object (real picture) is intended to be faithfully reproduced in a printed picture or when a tone of a printed picture is deliberately controlled (that is, corrected or modified). In the later case, by deliberately changing the $\gamma$ value, the configuration of the X axis color separation curve may be changed as desired (or may be changed to permit a reproduced printed picture to have a desired tone), thereby yielding printed pictures with various tone. For example, a positive value larger than zero of the $\gamma$ leads to an upheaven shape of the X axis color separation curve (leading in turn to an emphasis of a tone in a highlight area and a middle tone area). A value of the parameter $\gamma$ close to zero leads to an approximately straight line of the curve. A negative value of the parameter $\gamma$ leads to a concave shape of the curve (leading in turn to an emphasis of a tone in the middle tone area and the shadow area).

It is admittable to modify the tonal conversion formula upon operating it as follows, to say nothing of applying any process; modification, derivation, etc. to the formula:

$$y = y_H + E(1-10^{-k \cdot x}) \cdot (y_S - y_H)$$

where
$$E = 1/(1-\beta) = 1/(1-10^{-\gamma})$$

In the above modified formula, a value of reflectance of a printing paper $\alpha$ is set to 1.

In the above case, $\alpha=1$ means that the surface reflectance of the printing paper (material) on which a printed picture is expressed is assumed to be 100% so that the $\alpha$ value may be adjusted to zero point of brightness of the printing paper in practise. However, any value may be set to $\alpha$ as desired.

A feature of the tonal conversion formula of this invention is that it is possible to set $y_H$ to the highlight area (H) in the printed picture and $y_S$ to the shadow area (S) in, for example, the above modified example ($\alpha=1.0$). That is obvious from that $X=(X_n-X_H)=0$ in the highlight area (H) in the printed picture from the definition and the fact $X=X_S-X_H$ in the shadow area (S), namely:

$$-k.x= =\gamma.(X_S-X_H)/(X_S-X_H)=-\gamma.$$

It is useful for a user when priory speculating in prior a result of his printing work to set $y_H$ and $y_S$ to the H and S areas in a printed picture as intended by conducting the tonal conversion formula (a modification of $\alpha=1$) of this invention. For example, various X axis color separation curve is obtainable by setting a desired value to $y_H$ and $y_S$ in a printed picture and by varying the a value (under a condition at $\alpha=1.0$). The user can easily suppose a resulting printed picture produced using the X axis color separation curve set in such manner, from consideration of a relationship between the $\gamma$ value and the configuration of the curve.

An important point in the plate-making practise is that an X axis color separation curve obtained according to this invention shows a tonal characteristic in a range from a H area to the S area of a printed picture as a final product, differently from the conventional D axis color separation curve. A worker can accurately estimate a finish (of a tone) of a final printed picture from consideration of a configuration of an X axis color-separation curve with predetermined $y_H$, $y_S$ and $\gamma$ values, since it is a fact that a plurality of X axis color separation curves set to a plurality of original pictures having different picture quality (different exposure condition, for example), respectively, converge into the same single curve, which is an outstanding feature of the tonal conversion formula of this invention. To the contrary, the conventional D axis color separation curves present different configurations corresponding to respective original pictures having different picture quality (even if employing the same $y_H$, $y_S$ and $\gamma$ values), which configurations of which are complicated. Consideration of the configuration of the conventional D axis color separation curve is useless to accurately suppose a finish of a final reproduced printing picture. According to this invention, for example, X axis color separation curves for C, M, Y and B plates are displayed on a monitor screen to predict with accuracy a finish of a final printed picture, thereby skipping various proofing works and accomplishing direct plate making.

It is possible to regularize the k value to the $\gamma$ value, i.e., $(X_X-X_H)=1.0$, when operating the tonal conversion formula. Such regularization of a dynamic range of $X_H$ to $X_S$ to $1-0=1.0$ is effective to allow easy examination and comparison of the plural X axis color separation curves with each other and easy computation of the tonal conversion formula. Although light intensity values (x) of pixels within the dynamic range practically are varied when the regularization is carried out, such variation in the light intensity values can be ignored when setting color separation curves since it is comparative. In the following description, the y values were calculated using a regularized values.

The X axis color separation curves for the other plates, M, Y and B (C, M, Y and B plates are treated as a set, in practise), made use in multicolor plate making work operating the tonal conversion formula according to a desired design in the same fashion as the C plate.

The above is descriptions summarizing the tonal conversion method employed in a tone converting part in a color scanner, the tone converting part being an essential part of the scanner when carrying out production of a printed picture.

The next description will be about an improvement made on the tone converting part of a color scanner adapted to store the tonal conversion method of this invention therein.

The tonal conversion formula needs to be stored in the tone converting part in a color scanner to perform tone conversion process operating the tonal conversion formula to produce a printed picture.

As stated, the tonal conversion process of a picture comprises the steps of: designating a highlight area (H) and a shadow area (S) in a color photographic original; measuring density values ($D_H$, $D_S$) of the H and S areas; determining light intensity values ($X_H$, $X_S$) corresponding to the density values ($D_H$, $D_S$); operating the tonal conversion formula using the light intensity values ($X_H$, $X_S$) along with the other parameters ($\gamma$, $y_H$ and $y_S$ values), and performing the tone conversion (or setting X axis color separation curves).

However, there occurs a problem that the density values of the H and S areas in the color photographic original are measured unavoidably with variations to some extent.

The variations in measured density values have an inverse effect on the tone, i.e., density gradation or color tone, and the gray balance (maintaining an equivalent value neutral density), leading to a failure to produce a printed picture as intended.

A research has been made on variations in density values measured in the H and S areas of various originals (namely, light original, standard original and dark original) in the case of production of C plate. Results are shown in Table 2. The research has been made using a color photographic original (taken with a film of Daylight, ASA: 100) and a color scanner (a color scanner 455 manufactured by ISOMET).

TABLE 2

| | | VARIATIONS IN DENSITY VALUES MEASURED IN H AND S AREA | | | | | |
|---|---|---|---|---|---|---|---|
| | | | | managing point | | | |
| | | | | H | | S | |
| | | | | variation | | | |
| | | | measured value | variation width | measured value | variation width | |
| type of color | light | (0.175–2.500) | 2.325 | 0.150–0.200 | 0.050 | 2.400–2.600 | 0.200 |
| | standard | (0.300–2.700) | 2.400 | 0.275–0.325 | 0.050 | 2.600–2.900 | 0.300 |

TABLE 2-continued

VARIATIONS IN DENSITY VALUES MEASURED IN H AND S AREA

| | | | | managing point | | | |
|---|---|---|---|---|---|---|---|
| | | | | H | | S | |
| | | | | variation | | | |
| | | | | measured value | variation width | measured value | variation width |
| original | dark | (0.500–2.750) | 2.250 | 0.450–0.550 | 0.100 | 2.600–2.900 | 0.300 |

The next research was how the variations in the density values measured in the H and S area of the originals exert an effect on converted tones reproduced on color plates of a halftone, the photographic originals having been taken with Fuji Chrome 100, Professional, Day light (tradename). The results are shown in Tables 3 through 7. Table 3 shows results of measured density values of a bright photographic color original (a density range of a reference original: 0.175–2.325), Table 4 showing results of a standard color photographic original (a density range of the reference original: 0.300–2.700), Table 5 showing results of a dark color photographic original (a density range of a reference original: 0.500–2.750), Table 6 showing result of an extremely bright color photographic original (a density range of a reference original: 0.125–1,850), and Table 7 showing results of an extremely dark color photographic original (a density range of a reference original: 0.900–3.100). The experiments of which results are shown in Tables 3 through 7 were made under the following conditions:

(1) A daylight film was used to examine the variations in the density values measured in the H and S areas.

(2) On the assumption that a C plate is made, yH, yS and $\gamma$ values were set to 5%, 95% and 0.45, respectively, upon conduction of the tonal conversion formula. The numerical values shown in the respective tables are y values (dot area % values) obtained computing the tonal conversion formula, of course.

In Tables 3 through 7, columns titled show the respective color photographic originals in which density values were measured as designed (namely, there is no variation in measured density values, hereinafter called "reference original"). In each table, the density values with variation of the sample original were compared with those of the reference original.

In each table, $\frac{1}{8}$, $\frac{1}{4}$, $\frac{3}{8}$, $\frac{1}{2}$ and $\frac{3}{4}$ in the second column showing density mean respective managing points in the tonal conversion process. The third column shows density values in managing points where density range (i.e., dynamic range) of the reference original is increased step by step, beginning from H at a rate of $\frac{1}{8}$, $\frac{1}{4}$, $\frac{3}{8}$, $\frac{1}{2}$ to $\frac{3}{4}$.

From Tables 3 through 7, it will be appreciated that how much the dot area % values are removed from those of the reference originals in the respective managing points due to variations in the measured density values.

TABLE 3

BRIGHT COLOR PHOTOGRAPHIC ORIGINAL (Density Value of Reference Original = 0.1750–2.5000 = 2.3250)

| | | | | | | | managing point | | | | | | |
|---|---|---|---|---|---|---|---|---|---|---|---|---|---|
| | | | H | | | | | middle | | | | S | |
| | | | | | | | | density | | | | | |
| | | | 0.1500–0.2000 | | | $\frac{1}{8}$ | $\frac{1}{4}$ | $\frac{3}{8}$ | 2/4 | $\frac{3}{4}$ | 2.4000–2.6000 | | |
| | | D.R. | 0.1500 | 0.1750 | 0.2000 | 0.2906 | 0.7563 | 0.9500 | 1.3375 | 1.9188 | 2.4000 | 2.5000 | 2.6000 |
| density value range | 0.1500–2.4000 | 2.2500 | 5.0000 | 12.7409 | 20.0522 | 33.5491 | 60.7882 | 67.2790 | 77.8504 | 88.5844 | 95.0000 | — | — |
| | 0.1500–2.5000 | 2.3500 | 5.0000 | 12.5769 | 19.7294 | 32.9613 | 59.8024 | 66.2238 | 76.7083 | 87.4019 | 93.8097 | 95.0000 | — |
| | 0.1500–2.6000 | 2.4500 | 5.0000 | 12.3991 | 19.3928 | 32.3587 | 58.7783 | 65.0473 | 75.5251 | 86.1581 | 92.5605 | 93.7519 | 95.0000 |
| | 0.1750–2.4000 | 2.2250 | 29— | 5.0000 | 13.1770 | 28.2054 | 58.1812 | 65.2528 | 76.6802 | 88.1832 | 95.0000 | — | — |
| | 0.1750–2.5000 | 2.3250 | — | 5.0000 | 12.9874 | 27.6862 | 57.1738 | 64.1532 | 75.4822 | 86.9326 | 93.7414 | 95.0000 | — |
| | 0.1750–2.6000 | 2.4250 | — | 5.0000 | 12.7954 | 27.1646 | 56.1271 | 63.0215 | 74.2413 | 85.6238 | 92.4204 | 93.6835 | 95.0000 |
| | 0.2000–2.4000 | 2.2000 | — | — | 5.0000 | 21.8824 | 55.1512 | 62.9033 | 75.3463 | 87.7322 | 95.0000 | — | — |
| | 0.2000–2.5000 | 2.3000 | — | — | 5.0000 | 21.4752 | 54.1271 | 61.7711 | 74.0883 | 86.4054 | 93.6624 | 95.0000 | — |
| | 0.2000–2.6000 | 2.4000 | — | — | 5.0000 | 21.0538 | 53.0628 | 60.6059 | 72.7852 | 85.0230 | 92.2637 | 93.6045 | 95.0000 |

TABLE 4

STANDARD COLOR PHOTOGRAPHIC ORIGINAL (Density Value of Reference Original = 0.3000–2.7000 = 2.4000)

| | | | | | | | managing point | | | | | | |
|---|---|---|---|---|---|---|---|---|---|---|---|---|---|
| | | | H | | | | | middle | | | | S | |
| | | | | | | | | density | | | | | |
| | | | 0.2750–0.3250 | | | $\frac{1}{8}$ | $\frac{1}{4}$ | $\frac{3}{8}$ | 2/4 | $\frac{3}{4}$ | 2.6000–2.8000 | | |
| | | D.R. | 0.2750 | 0.3000 | 0.3250 | 0.6000 | 0.9000 | 1.1000 | 1.5000 | 2.1000 | 2.6000 | 2.7000 | 2.8000 |
| density value range | 0.2750–2.6000 | 2.3250 | 5.0000 | 9.6332 | 13.3538 | 38.3286 | 53.3749 | 61.7883 | 76.0732 | 87.2301 | 95.0000 | — | — |
| | 0.2750–2.7000 | 2.4250 | 5.0000 | 9.4934 | 13.1226 | 37.4782 | 52.2444 | 60.5276 | 74.6550 | 85.7396 | 93.4936 | 95.0000 | — |
| | 0.2750–2.8000 | 2.5250 | 5.0000 | 9.3534 | 12.8637 | 36.5316 | 50.9644 | 59.0974 | 73.0226 | 84.0226 | 91.7579 | 93.2606 | 95.0000 |
| | 0.3000–2.6000 | 2.3000 | — | 5.0000 | 8.9889 | 35.5652 | 51.4862 | 60.3534 | 75.3248 | 86.9605 | 95.0000 | — | — |
| | 0.3000–2.7000 | 2.4000 | — | 5.0000 | 8.8765 | 34.7609 | 50.3519 | 59.0709 | 73.8618 | 85.4099 | 93.2871 | 95.0000 | — |
| | 0.3000–2.8000 | 2.5000 | — | 5.0000 | 8.7359 | 33.8476 | 49.0752 | 57.6160 | 72.1883 | 83.6392 | 91.6485 | 93.2022 | 95.0000 |
| | 0.3250–2.6000 | 2.2750 | — | — | 5.0000 | 33.0652 | 49.7746 | 59.0532 | 74.6550 | 86.6996 | 95.0000 | — | — |
| | 0.3250–2.7000 | 2.3750 | — | — | 5.0000 | 32.2890 | 48.6491 | 57.7599 | 73.1557 | 85.1153 | 93.3984 | 95.0000 | — |

TABLE 4-continued

STANDARD COLOR PHOTOGRAPHIC ORIGINAL (Density Value of Reference Original = 0.3000–2.7000 = 2.4000)

| | | | managing point | | | | | | | | | |
|---|---|---|---|---|---|---|---|---|---|---|---|---|
| | | | H | | | middle | | | | | S | | |
| | | | | | | density | | | | | | | |
| | | | 0.2750–0.3250 | | | 1/8 | 1/4 | 3/8 | 2/4 | 5/8 | 2.6000–2.8000 | | |
| | | D.R. | 0.2750 | 0.3000 | 0.3250 | 0.6000 | 0.9000 | 1.1000 | 1.5000 | 2.1000 | 2.6000 | 2.7000 | 2.8000 |
| | 0.3250–2.8000 | 2.4750 | — | — | 5.0000 | 31.4253 | 47.3494 | 56.2917 | 71.4505 | 83.2977 | 91.5554 | 93.1543 | 95.0000 |

TABLE 5

DARK COLOR PHOTOGRAPHIC ORIGINAL (Density Value of Reference Original = 0.5000–2.7500 = 2.2500)

| | | | managing point | | | | | | | | | | |
|---|---|---|---|---|---|---|---|---|---|---|---|---|---|
| | | | H | | | middle | | | | | S | | | |
| | | | | | | density | | | | | | | | |
| | | | 0.4500–0.5500 | | | 1/8 | 1/4 | 3/8 | 2/4 | 5/8 | 2.6000–2.90000 | | | |
| | | D.R. | 0.4500 | 0.5000 | 0.5500 | 0.7813 | 1.0625 | 1.2500 | 1.6250 | 2.1875 | 2.6000 | 2.7500 | 2.9000 |
| density value range | 0.4500–2.6000 | 2.1500 | 5.0000 | 11.1339 | 15.5901 | 33.5721 | 50.3811 | 59.9777 | 72.6215 | 87.2241 | 95.0000 | — | — |
| | 0.4500–2.7500 | 2.3000 | 5.0000 | 10.8296 | 15.0681 | 32.2541 | 48.4603 | 57.7778 | 70.1370 | 84.5466 | 92.3069 | 95.0000 | — |
| | 0.4500–2.9000 | 2.4500 | 5.0000 | 10.4412 | 14.4228 | 30.5551 | 46.0626 | 55.0029 | 66.9744 | 81.1035 | 88.7925 | 91.4840 | 95.0000 |
| | 0.5000–2.6000 | 2.1000 | — | 5.0000 | 9.8705 | 29.4280 | 47.5907 | 57.0935 | 71.3974 | 86.8431 | 95.0000 | — | — |
| | 0.5000–2.7500 | 2.2500 | — | 5.0000 | 9.6052 | 28.2416 | 45.6845 | 55.6681 | 68.8235 | 84.0539 | 92.1770 | 95.0000 | — |
| | 0.5000–2.9000 | 2.4000 | — | 5.0000 | 9.1993 | 26.3472 | 42.6177 | 52.0339 | 64.6098 | 79.4063 | 87.4255 | 90.2393 | 95.0000 |
| | 0.5500–2.6000 | 2.0500 | — | — | 5.0000 | 25.9303 | 45.2536 | 56.1637 | 70.3754 | 86.5317 | 95.0000 | — | — |
| | 0.5500–2.7500 | 2.2000 | — | — | 5.0000 | 24.8691 | 43.3749 | 53.9021 | 67.7417 | 83.6455 | 92.0793 | 95.0000 | — |
| | 0.5500–2.9000 | 2.3500 | — | — | 5.0000 | 23.5605 | 41.0434 | 51.9093 | 64.4192 | 79.9750 | 88.3114 | 91.2253 | 95.0000 |

TABLE 6

EXTREMELY BRIGHT COLOR PHOTOGRAPHIC ORIGINAL (Density Value of Reference Original = 0.1250–1.8500 = 1.7250)

| | | | managing point | | | | | | | | | | |
|---|---|---|---|---|---|---|---|---|---|---|---|---|---|
| | | | H | | | middle | | | | | S | | | |
| | | | | | | density | | | | | | | | |
| | | | 0.1000–0.1500 | | | 1/8 | 1/4 | 3/8 | 2/4 | 5/8 | 1.8000–1.9000 | | | |
| | | D.R. | 0.1000 | 0.1250 | 0.1500 | 0.3406 | 0.5563 | 0.7000 | 0.9875 | 1.4188 | 1.8000 | 1.8500 | 1.9000 |
| density value range | 0.1000–1.8000 | 1.7000 | 5.0000 | 19.1463 | 31.8580 | 57.5439 | 68.4541 | 72.9855 | 80.6619 | 89.3610 | 95.0000 | — | — |
| | 0.1000–1.8500 | 1.7500 | 5.0000 | 18.9643 | 31.5307 | 56.9926 | 67.8921 | 72.3380 | 79.9904 | 88.6712 | 94.3009 | 95.0000 | — |
| | 0.1000–1.9000 | 1.8000 | 5.0000 | 18.7821 | 31.2025 | 56.4469 | 67.2150 | 71.7073 | 79.3253 | 87.9845 | 93.6150 | 94.3113 | 95.0000 |
| | 0.1250–1.8000 | 1.6750 | — | 5.0000 | 20.6824 | 51.7268 | 64.6015 | 69.8900 | 78.7692 | 88.6770 | 95.0000 | — | — |
| | 0.1250–1.8500 | 1.7250 | — | 5.0000 | 20.4127 | 51.0516 | 63.8029 | 69.0583 | 77.8849 | 87.7557 | 94.0925 | 95.0000 | — |
| | 0.1250–1.9000 | 1.7750 | — | 5.0000 | 20.2454 | 50.5954 | 63.2744 | 68.5013 | 77.2887 | 87.1469 | 93.4619 | 94.3841 | 95.0000 |
| | 0.1500–1.8000 | 1.6500 | — | — | 5.0000 | 43.8244 | 59.4683 | 65.8091 | 76.2997 | 87.7968 | 95.0000 | — | — |
| | 0.1500–1.8500 | 1.7000 | — | — | 5.0000 | 43.1651 | 58.6183 | 64.8989 | 75.3104 | 86.7594 | 93.9565 | 95.0000 | — |
| | 0.1500–1.9000 | 1.7500 | — | — | 5.0000 | 42.7337 | 58.0559 | 64.2946 | 74.6550 | 86.0734 | 93.2659 | 94.1395 | 95.0000 |

TABLE 7

EXTREMELY DARK COLOR PHOTOGRAPHIC ORIGINAL (Density Value of Reference Original = 0.9000–3.1000 = 2.2000)

| | | | managing point | | | | | | | | | | |
|---|---|---|---|---|---|---|---|---|---|---|---|---|---|
| | | | H | | | middle | | | | | S | | | |
| | | | | | | density | | | | | | | | |
| | | | 0.8000–1.0000 | | | 1/8 | 1/4 | 3/8 | 2/4 | 5/8 | 3.0000–3.2000 | | | |
| | | D.R. | 0.8000 | 0.9000 | 1.0000 | 1.1750 | 1.4500 | 1.6333 | 2.0000 | 2.5500 | 3.0000 | 3.1000 | 3.2000 |
| density value range | 0.8000–3.0000 | 2.2000 | 5.0000 | 13.3402 | 21.1689 | 33.5951 | 47.7812 | 55.5483 | 69.2613 | 83.1136 | 95.0000 | — | — |
| | 0.8000–3.1000 | 2.3000 | 5.0000 | 12.7818 | 20.1295 | 31.8346 | 45.3255 | 52.7687 | 66.0217 | 79.5679 | 91.3631 | 95.0000 | — |
| | 0.8000–3.2000 | 2.4000 | 5.0000 | 12.2896 | 19.2112 | 30.2832 | 43.1336 | 50.2738 | 63.0637 | 76.3067 | 87.9728 | 91.6047 | 95.0000 |
| | 0.9000–3.0000 | 2.1000 | — | 5.0000 | 13.8420 | 27.7830 | 43.5947 | 52.1871 | 67.2390 | 82.2748 | 95.0000 | — | — |
| | 0.9000–3.1000 | 2.2000 | — | 5.0000 | 13.2178 | 26.2738 | 41.2040 | 49.3911 | 63.8614 | 78.5237 | 91.1424 | 95.0000 | — |
| | 0.9000–3.2000 | 2.3000 | — | 5.0000 | 12.6862 | 24.9434 | 39.0849 | 46.8954 | 60.8229 | 75.1022 | 87.5614 | 91.4126 | 95.0000 |
| | 1.0000–3.0000 | 2.0000 | — | — | 5.0000 | 20.8362 | 38.6362 | 48.2211 | 64.8825 | 81.3068 | 95.0000 | — | — |
| | 1.0000–3.1000 | 2.1000 | — | — | 5.0000 | 19.6777 | 36.3636 | 45/4395 | 61.3759 | 77.3374 | 90.8931 | 95.0000 | — |
| | 1.0000–3.2000 | 2.2000 | — | — | 5.0000 | 18.6779 | 34.3737 | 42.9865 | 58.2438 | 73.7373 | 87.0994 | 91.1921 | 95.0000 |

Tables 3 through 7, which were tabulated taking the variation occurring in the density measuring work shown in Table 2 into account, clearly show that the measured density values are noticeably removed from the values set in the plate making design in the respective managing points. The managing points of 1/8, 174 and 3/8 are included in ranges particularly important to produce a printed picture of an excellent quality. From these tables, it will be also seen that the dot area % values measured in the managing points of ¼, ¼ and ⅜ are far removed from values set in prior when designing the plates.

It is dispensable to clearly recognize the meaning of variations occurring in density values measured in H and S areas of an original picture and to develop a measure to solve the problem due to such variations.

The variations in density values measured in the H and S areas of an original picture unavoidably occurs when using a color photographic original as an original picture.

The occurrence of the variations is attributable mainly to a size and a shape of silver grains contained in a color film emulsifier, a dispersed state of the silver grains, and a size of an aperture (or a slit) formed in a color scanner. Scanning luminous flux is passed through or is reflected by a pixel in a H area of an original, advancing through an aperture of a scanner having a predetermined size corresponding to a size of a scanned pixel to be converted into an electric voltage, whereby a density value of the pixel is measured.

Figure 2:
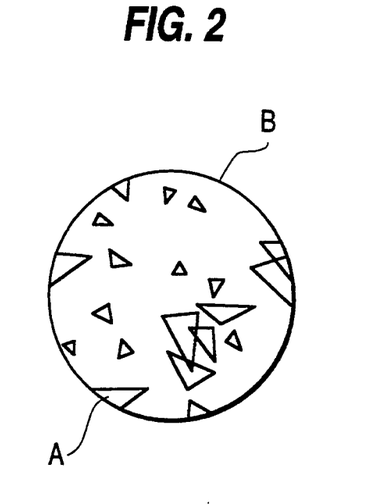
FIG. 2 is a schematic illustration showing silver grains dispersed in an emulsion layer of a film within a field of vision of an aperture formed in a color scanner.

FIG. 2 is a schematic illustration showing a relationship between silver grains A and an aperture B of a scanner.

The silver grain contained in R, G and B emulsion layers of a color film has, in general, a size of 1-3 $\mu m^2$ and the aperture of a scanner has, in general, a diameter of 1 to several millimeters.

To carry out the tonal conversion work conducting the tonal conversion formula of this invention in a tone converting part of a color scanner used, a head of the scanner is positioned above assigned H and S areas to measure density of the H and S areas. However, ununiformity of location and size of the silver grains, and inaccurate positioning of the aperture relating to the H area cause occurrence of variations in measured density values in the H and S areas.

More specifically, the variation occurring when density is measured in an H and S areas of an original designated by a plate-making designer or an operator is caused from the following facts that:

(1) it is difficult to accurately position the aperture of a scanner having a predetermined opening rate in relation with the H and S areas designated on the original, the aperture being used to pass a light to measure the density (that is, to measure light intensity of a reflected light or a transmitted light from the original); and/or (2) even if the aperture is positioned accurately with respect to the H and S areas designated, there is ununiformity of size and distribution of the silver grains, as mentioned above. It is possible that there are another optimum areas in the vicinity of the designated H and S areas (the ununiformity of the distribution and size of the silver grains can be easily recognized since the density of the H and S areas are normally measured with a magnifier). It is possible to happen a case that the density in the areas designated by the worker or the operator are measured, or the density in the areas assumed to be optimal rather than the designated parts are intentionally measured.

In order to overcome the disadvantage due to variations in measured density values in H and S areas, a density measuring part in a color scanner made use to produce a printed picture is so arranged as to output representative density values ($DH_{av}$) measured in the highlight area (H) and in an area in the vicinity of the highlight area (H), and another representative density values (($DS_{av}$) in the shadow area (S) and an area in the vicinity of the shadow area (S).

A tone converting part in the color scanner is so arranged as to determine corresponding light intensity values ($X_H$, $X_S$) from the representative density values ($DH_{av}$, $DS_{av}$) and to perform a tone conversion process conducting the tonal conversion formula of this invention.

Any manner used to determine the representative density values ($DH_{av}$, $DS_{av}$) is applicable as long as it can solve the problem of occurring variations in measured density values.

For example, an average value, a value most frequently occurring, standard deviation may be used as the representative density values ($DH_{av}$, $DS_{av}$). Hereinafter, a average density value will be used as the representative density value.

Measurement of density values in the shadow area (H) and an area in the vicinity thereof and in the highlight area (S) and an area in the vicinity thereof may be made in any fashion as long as it is adaptive to a color scanner. In the case of a scanner of a cylinder type, the operator may slightly move the cylinder or give small vibrations to an aperture of the scanner upon measuring the density. In the case of a scanner of a flat-bed type, it is possible to average density information values of pixels surrounding a predetermined pixel and store the averaged density information values in, for example, a CCD. It is also possible that desired number of glass fibers extremely thin are grouped together, the density values are measured with the respective glass fibers and the measured density values are averaged.

When determining an average density value, it is possible to measure the density values in the highlight area (H) and thereabout, then subsequently displacing the measured area. It is known from a number of experiments that it is sufficient to measure the density values three to five times to determine an average value. The number of the measurement may be suitably selected, taking a type of a film used and a structure of the aperture into consideration.

Tables 8 through 11 show dot area % values of a halftone picture (i.e., an original plate for C) outputted from a scanner when the variation of density values measured in H and S areas are controlled to be adjusted.

An effect of an improvement made in tone characteristic of a halftone picture outputted from a scanner accomplished by this invention is different from case to case, such as:

(case 1) the variations in the density values measured in the H and S areas is adjusted to average density values ($DH_{av}$, $DS_{av}$); and (case 2) in addition to (case 1), the $\gamma$ value is adjusted. Incidentally, a tone characteristic may be rationally changed by adjusting the $\gamma$ value, more effectively as stated before.

Tables 8 to 9 show effects of the improvement in the case (1), while Tables 10 to 11 show effects of the improvement in the case (2). When comparing Tables 3 through 7 with Tables 8 to 9, and further with Tables 10 to 11, it will be appreciated that the improvement in the case (1) is very effective and the improvement in the case (2) is more effective than in the case (1).

Tables 8 through 11 were tabulated under the following conditions:

(1) sample color photographic original (taken with a daylight film): a color original having a standard quality (2) density range of a photographic original used as a reference of the adjustment; 2.4000(0.3000–2.7000)
(3) parameters of the tonal conversion formula:
$y_H = 5\%$
$y_S = 95\%$
$\gamma$ value = 0.4500 in Tables 8 to 9
$\gamma$ value: adjusted in Tables 10 to 11.

Titles of the respective tables show degree of variations in relation with a density value (0.3000) in a H area and a density value (2.7000) in a S area of the reference original. It is a matter of course that the variations were improved rather than that shown in Tables 3 through 7 since the density values were averaged to be adjusted.

TABLE 8

RANGE OF VARIATIONS IN MEASURED DENSITY VALUES: H ± 0.0125, S ± 0.0500

|  |  |  | \multicolumn{3}{c}{H} | \multicolumn{5}{c}{middle} | \multicolumn{3}{c}{S} |
|---|---|---|---|---|---|---|---|---|---|---|---|---|---|
|  |  |  | \multicolumn{3}{c}{0.2875–0.3125} | 1/8 | 1/4 | 3/8 | 2/4 | 3/4 | \multicolumn{3}{c}{2.6500–2.7500} |
|  |  |  | 0.2875 | 0.3000 | 0.3125 | 0.6000 | 0.9000 | 1.1000 | 1.5000 | 2.1000 | 2.6500 | 2.7000 | 2.7500 |
| color | 0.2875–2.6500 | (DR:2.3625) | 5.0000 | 7.0943 | 9.0029 | 36.4084 | 51.8997 | 60.3622 | 72.8743 | 86.3090 | 95.0000 | — | — |
| original | 0.2875–2.7000 | (DR:2.4125) | 5.0000 | 7.0516 | 8.9467 | 36.0045 | 51.3416 | 59.7410 | 72.1658 | 85.5566 | 94.2385 | 95.0000 | — |
| density | 0.2875–2.7500 | (DR:2.4625) | 5.0000 | 7.0231 | 8.8905 | 35.6104 | 50.7898 | 59.1240 | 71.4731 | 84.8192 | 93.4883 | 94.2489 | 95.0000 |
| value | 0.3000–2.6500 | (DR:2.3500) | — | 5.0000 | 6.9804 | 35.1582 | 51.0322 | 59.7058 | 72.4799 | 86.1702 | 95.0000 | — | — |
| range | 0.3000–2.7000 | (DR:2.4000) | — | 5.0000 | 6.9519 | 34.7609 | 50.4785 | 59.0709 | 71.7676 | 85.4099 | 94.2281 | 95.0000 | — |
| (density | 0.3000–2.7500 | (DR:2.4500) | — | 5.0000 | 6.9234 | 34.3623 | 49.9315 | 58.4491 | 71.0634 | 84.6583 | 93.4672 | 94.2385 | 95.0000 |
| range) | 0.3125–2.6500 | (DR:2.3375) | — | — | 5.0000 | 33.9392 | 50.2054 | 59.0621 | 72.0984 | 86.0371 | 95.0000 | — | — |
|  | 0.3125–2.7000 | (DR:2.3875) | — | — | 5.0000 | 33.5491 | 49.6469 | 58.4224 | 71.3822 | 85.2628 | 94.2177 | 95.0000 | — |
|  | 0.3125–2.7500 | (DR:2.4375) | — | — | 5.0000 | 33.1691 | 49.0950 | 57.8048 | 70.6743 | 84.5031 | 93.4460 | 94.2281 | 95.0000 |

TABLE 9

RANGE OF VARIATIONS IN MEASURED DENSITY VALUES: H ± 0.0100, S ± 0.0250

|  |  |  | \multicolumn{3}{c}{H} | \multicolumn{5}{c}{middle} | \multicolumn{3}{c}{S} |
|---|---|---|---|---|---|---|---|---|---|---|---|---|---|
|  |  |  | \multicolumn{3}{c}{0.2900–0.3100} | 1/8 | 1/4 | 3/8 | 2/4 | 3/4 | \multicolumn{3}{c}{2.6750–2.7250} |
|  |  |  | 0.2900 | 0.3000 | 0.3100 | 0.6000 | 0.9000 | 1.1000 | 1.5000 | 2.1000 | 2.6750 | 2.7000 | 2.7250 |
| color | 0.2900–2.6750 | (DR:2.3850) | 5.0000 | 6.5666 | 8.1014 | 35.8920 | 51.3995 | 59.8813 | 72.4202 | 85.8976 | 95.0000 | — | — |
| original | 0.2900–2.7000 | (DR:2.4100) | 5.0000 | 6.5523 | 8.0732 | 35.6893 | 51.1290 | 59.5739 | 72.3380 | 85.5200 | 94.6172 | 95.0000 | — |
| density | 0.2900–2.7250 | (DR:2.4350) | 5.0000 | 6.5380 | 8.0449 | 35.4975 | 50.8480 | 59.2566 | 72.7148 | 85.3670 | 94.2385 | 94.6172 | 95.0000 |
| value | 0.3000–2.6750 | (DR:2.3750) | — | 5.0000 | 6.5666 | 34.9540 | 50.7510 | 59.3801 | 72.1209 | 85.7882 | 95.0000 | — | — |
| range | 0.3000–2.7000 | (DR:2.4000) | — | 5.0000 | 6.5523 | 34.7609 | 50.4786 | 59.0709 | 71.7676 | 85.4100 | 94.6172 | 95.0000 | — |
| (density | 0.3000–2.7250 | (DR:2.4250) | — | 5.0000 | 6.5523 | 34.5561 | 50.2054 | 58.7606 | 71.4125 | 85.0291 | 94.2333 | 94.6120 | 95.0000 |
| range) | 0.3100–2.6750 | (DR:2.3650) | — | — | 5.0000 | 33.9850 | 50.0881 | 58.8761 | 71.8203 | 85.6787 | 95.0000 | — | — |
|  | 0.3100–2.7000 | (DR:2.3900) | — | — | 5.0000 | 33.7902 | 45.8138 | 58.5560 | 71.4600 | 85.2935 | 94.6068 | 95.0000 | — |
|  | 0.3100–2.7250 | (DR:2.4150) | — | — | 5.0000 | 33.6065 | 49.5387 | 58.2438 | 71.1014 | 84.9120 | 94.2229 | 94.6120 | 95.0000 |

TABLE 10

RANGE OF VARIATIONS IN MEASURED DENSITY VALUES: H ± 0.0125 S ± 0.0500

|  |  |  | \multicolumn{3}{c}{H} | \multicolumn{5}{c}{middle} | \multicolumn{3}{c}{S} |
|---|---|---|---|---|---|---|---|---|---|---|---|---|---|
|  |  |  | \multicolumn{3}{c}{0.287–0.3125} | 1/8 | 1/4 | 3/8 | 2/4 | 3/4 | \multicolumn{3}{c}{2.6500–2.7500} |
|  |  |  | 0.2875 | 0.3000 | 0.3125 | 0.6000 | 0.9000 | 1.1000 | 1.5000 | 2.1000 | 2.6500 | 2.7000 | 2.7500 |
| color original density value range (density range) | 0.2875–2.6500 | (DR:2.3625) | 0.3931 | 5.0000 | 6.9841 | 8.7955 | 35.1908 | 50.4786 | 58.9645 | 71.7145 | 85.7252 | 95.0000 | — | — |
|  | 0.2875–2.7000 | (DR:2.4125) | 0.4155 | 5.0000 | 6.9856 | 8.8217 | 35.2680 | 50.4780 | 58.8878 | 71.4481 | 85.1732 | 94.1978 | 95.0000 | — |
|  | 2.2875–2.7500 | (DR:2.4625) | 0.4374 | 5.0000 | 6.9994 | 8.8457 | 35.3463 | 50.8402 | 58.8180 | 71.2152 | 84.6802 | 94.4709 | 94.2440 | 95.0000 |
|  | 0.3000–2.6500 | (DR:2.3500) | 0.4278 | — | 5.0000 | 6.9393 | 34.6923 | 50.4784 | 59.1588 | 72.0245 | 85.9398 | 95.0000 | — | — |
|  | 0.3000–2.7000 | (DR:2.4000) | 0.4500 | — | 5.0000 | 6.9519 | 34.7609 | 50.4786 | 59.0709 | 71.7676 | 85.4099 | 94.2281 | 95.0000 | — |
|  | 0.3000–2.7500 | (DR:2.4500) | 0.4720 | — | 5.0000 | 6.9635 | 34.8187 | 50.4782 | 58.9932 | 71.5268 | 84.9162 | 93.5145 | 94.2600 | 95.0000 |
|  | 0.3125–2.6500 | (DR:2.3375) | 0.4610 | — | — | 5.0000 | 34.1635 | 50.4765 | 59.3304 | 72.3211 | 86.1474 | 95.0000 | — | — |
|  | 0.3125–2.7000 | (DR:2.3875) | 0.4835 | — | — | 5.0000 | 34.2327 | 50.4781 | 59.2499 | 72.0808 | 85.6350 | 94.2572 | 95.0000 | — |
|  | 0.3125–2.7500 | (DR:2.4375) | 0.5062 (Y value) | — | — | 5.0000 | 34.3039 | 50.4781 | 59.1852 | 71.8487 | 85.1494 | 93.5533 | 94.2860 | 95.0000 |

TABLE 11

| | | | | | | | managing point | | | | | | | |
|---|---|---|---|---|---|---|---|---|---|---|---|---|---|---|
| RANGE OF VARIATIONS IN MEASURED DENSITY VALUES: H ± 0.0100 S ± 0.0250 | | | | | | | | | | | | | | |
| | | | | H | | | middle | | | | | S | | |
| | | | | | | | density value | | | | | | | |
| | | | | 0.2900–0.3100 | | | 1/4 | 1/3 | .1/2 | 2/4 | 3/4 | 2.6750–2.7250 | | |
| | | | | 0.2900 | 0.3000 | 0.3100 | 0.6000 | 0.9000 | 1.1000 | 1.5000 | 2.1000 | 2.6750 | 2.7000 | 2.7250 |
| color original density value range (density range) | 0.2900–2.6750 | (DR: 2.3850) | 0.4129 | 5.0000 | 6.5124 | 7.9955 | 35.1066 | 50.4777 | 58.9728 | 71.6630 | 85.5097 | 95.0000 | — | — |
| | 0.2900–2.7000 | (DR: 2.4100) | 0.4238 | 5.0000 | 6.5143 | 7.9988 | 35.1361 | 50.4785 | 58.9316 | 71.5299 | 85.2370 | 94.6088 | 95.0000 | — |
| | 0.2900–2.7250 | (DR: 2.4350) | 0.4351 | 5.0000 | 6.5165 | 8.0029 | 35.1836 | 50.4782 | 58.8907 | 71.4063 | 84.9799 | 94.2255 | 94.6117 | 95.0000 |
| | 0.3000–2.6750 | (DR: 2.3750) | 0.4391 | — | 5.0000 | 6.5505 | 34.7254 | 50.4785 | 59.1103 | 71.8945 | 85.6698 | 95.0000 | — | — |
| | 0.3000–2.7000 | (DR: 2.4000) | 0.4500 | — | 5.0000 | 6.5523 | 34.7609 | 50.4786 | 59.0709 | 71.7676 | 85.4100 | 94.6172 | 95.0000 | — |
| | 0.3000–2.7250 | (DR: 2.4250) | 0.4610 | — | 5.0000 | 6.5684 | 34.7833 | 50.4765 | 59.0294 | 71.6391 | 85.1501 | 94.2409 | 94.6141 | 95.0000 |
| | 0.3100–2.6750 | (DR: 2.3650) | 0.4658 | — | — | 5.0000 | 34.3082 | 50.4782 | 59.2627 | 72.1435 | 85.8440 | 95.0000 | — | — |
| | 0.3100–2.7000 | (DR: 2.3900) | 0.4767 | — | — | 5.0000 | 34.3388 | 50.4786 | 59.2177 | 72.0172 | 85.5931 | 94.6283 | 95.0000 | — |
| | 0.3100–2.7250 | (DR: 2.4150) | 0.4879 (Y value) | — | — | 5.0000 | 34.3814 | 50.4789 | 59.1808 | 71.8965 | 85.3453 | 94.2680 | 94.6381 | 95.0000 |

Figure 3:
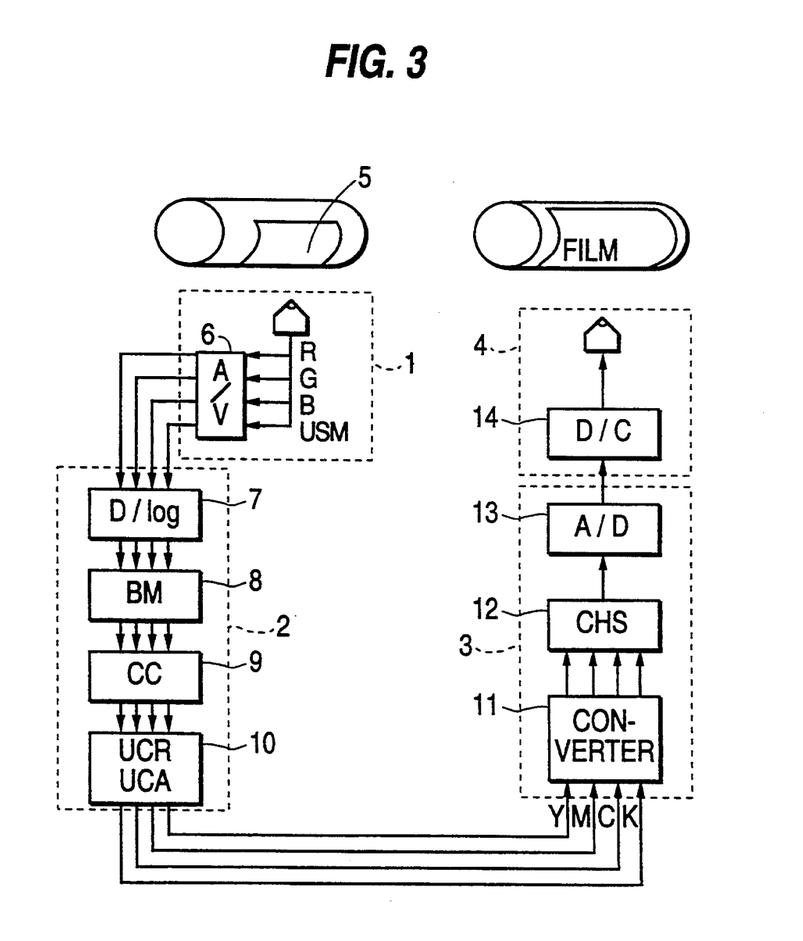
FIG. 3 is a schematic diagram showing a structure of a color scanner to which a tonal conversion method of a picture of this invention is applied.

Referring to FIG. 3, an arrangement of a color scanner system used to produce a printed picture will be hereinafter described.

A color scanner made use to perform this invention has a feature that it comprises a density measuring mechanism which can output average density values ($DH_{av}$, $DS_{av}$) measured in H and S areas designed in prior and an area in the vicinity thereof of an original picture and a tone converting mechanism which performs tone conversion by conducting the tonal conversion formula using said average density values ($DH_{av}$, $DS_{av}$). The remaining parts of the color scanner has essentially the same structure as the conventional color scanners. Therefore, the color scanner used in this invention needs only to incorporate the above mechanisms therein in order to perform the tonal conversion method of a picture according to this invention.

In FIG. 3, the color scanner of a cylinder type comprises a detecting part 1 reading out an original picture, a color separating part 2 converting output signals form the detecting part 1 into color separated signals Y, M, C and K, a tone controlling part 3 determining an appropriate halftone conducting the tonal conversion formula of this invention, an output part 4 exposing a raw film with a laser beam on the basis of the output signal from the tone controlling part 3. In the color scanner, the color separation part 2 and the output part 4 have the same structure as a conventional color scanner. Different points from the conventional color scanner are that the detecting part 1 calculates average values from density values measured in the highlight area (H) and the area in the vicinity thereof and in the shadow area (S) and the area in the vicinity thereof, and the tone controlling part 3 performs the tone conversion conducting the tonal conversion formula of this invention.

The detecting part 1 such as a photomultiplier detects a light transmitted through or reflected by each pixel of a color photographic original, outputs R, G, B and USM signals as electric current values, and converts the signals into electric voltage signals in an A/V converter 6. The detecting part 2 is of a function that detects a transmitted light (or a reflected light) in order to calculate average density values ($DH_{av}$, $DS_{av}$) from density values measured in the H and S areas and areas in the vicinity thereof, as stated above.

The color separation part 2 includes a logarithmic amplifier 7 which computes with logarithm the voltage signals of R, G, B and USM outputted from the detecting part 1 to convert them into density values, a basic masking circuit 8 which separates a gray (K) component from the density values and separates in turn Y, M and C components from the density values.

The detecting part 1 detects a transmitted light (or a reflected light), the A/V converter 6 converts the light into electric voltage signals and the logarithmic amplifier calculates with logarithm the voltage signals to determine average density values ($DH_{av}$, $DS_{av}$). The determined average density values ($DH_{av}$, $DS_{av}$) are fed to the tone converting part 3 to be treated as important constant terms in the tonal conversion formula of this invention.

The color separation part 2 further includes a color correction part 9 which controls Y plate components, M plate components and C plate components of R, G and B, and Y, M and C color originals, a UCR/UCA part 10 performs under-color-removal or under-color-addition to determine a proportion among the three plates, Y, M and C to express a picture and a proportion of K plate to express the same.

In a conventional color scanner system, a tone converting part (IMC) includes a gradation controlling part which determines effective dot area % values of ye′, me′, ce′ and ke′ of respective components, and an inverse logarithmic transformer transforms the determined dot area % values into inverse logarithmic values. In the color scanner shown in FIG. 3, the gradation controlling part and the inverse logarithmic transformer are replaced with the tone converting part 11, where Y, M, C and K are converted into ye′, me′, ce′ and ke′. The tone converting part 11 incorporates an algorithm of the tonal conversion formula of this invention to apply the tonal conversion formula to Y, M, C and K, respectively to determine ye′, me′, ce′ and ke′.

The tone converting part 11 may be realized in a form of a general-purpose computer having an algorithm of the tonal conversion formula therein, along with interfaces of A/D and D/A, an electric circuit including a general-purpose IC embodying the algorithm of the tonal conversion formula as a logic, an electric circuit including a ROM storing results operated with the algorithm, a PAL, a gate array, a custom IC embodying the algorithm of the tonal conversion formula as an internal logic, or the like.

The effective dot area % values determined in the tone converting part 11 are supplied to a color channel selector 12, which selectively outputs ye', me', ce' and ke', successively. The outputs of the color channel selector 12, ye', me' ce' and ke' are converted from an analogue form into a digital form in an A/D converter 13 then are outputted to the output part 4. The output part 4 includes a dot controller 14 which controls the laser beam in response to the outputs of the tone controlling part 3.

As stated hereinbefore, the present invention is not limited to only the field of art to produce a printed picture as a reproduced picture.

The tonal conversion method according to the invention is applicable to a thermally molten transfer printer in which a size of a dot may be changed in a picture reproducing system, a sublimation transfer type thermal printer in which density of a pixel itself is changed, a digital type reproduction machine (or a color copier) in which gradation is changed by changing an arrangement of dots, various printers (of a ink jet type, a bubble jet type or the like), etc.

In order to apply the tonal conversion method of this invention to various field of art, it is necessary to carry out the following steps in each system and equipment used to produce a reproduced picture:

(1) determining a light intensity value corresponding to a picture information value and/or a picture information electric signal value (which may be in analog or digital form) relating to density of a color photographic original, besides determining a light intensity value corresponding to an average density value obtained measuring H and S areas particularly designated;

(2) converting the light intensity value obtained in step (1) into a y value (a tone intensity value) conducting the tonal converting formula of this invention in a picture converting and processing part (a tone converting part) of the system; and (3) controlling an electric current value, an electric voltage value or a time period that the electric voltage or electric current is applied to a recording part (a recording head) of the system on the basis of the determined y value to change (a) size of a dot, (b) the number of dots per given pixels (i.e., a constant area) and an arrangement of the dots, or (c) density of a predetermined pixel itself (in a constant area).

In summary, it is sufficient to convert rationally and faithfully a density gradation of a dynamic range from a H to S area of an original picture into a reproduced picture at a rate of 1:1, using a dot size varying method, dot arrangement varying method or dot density varying method or the like.

Figure 4:
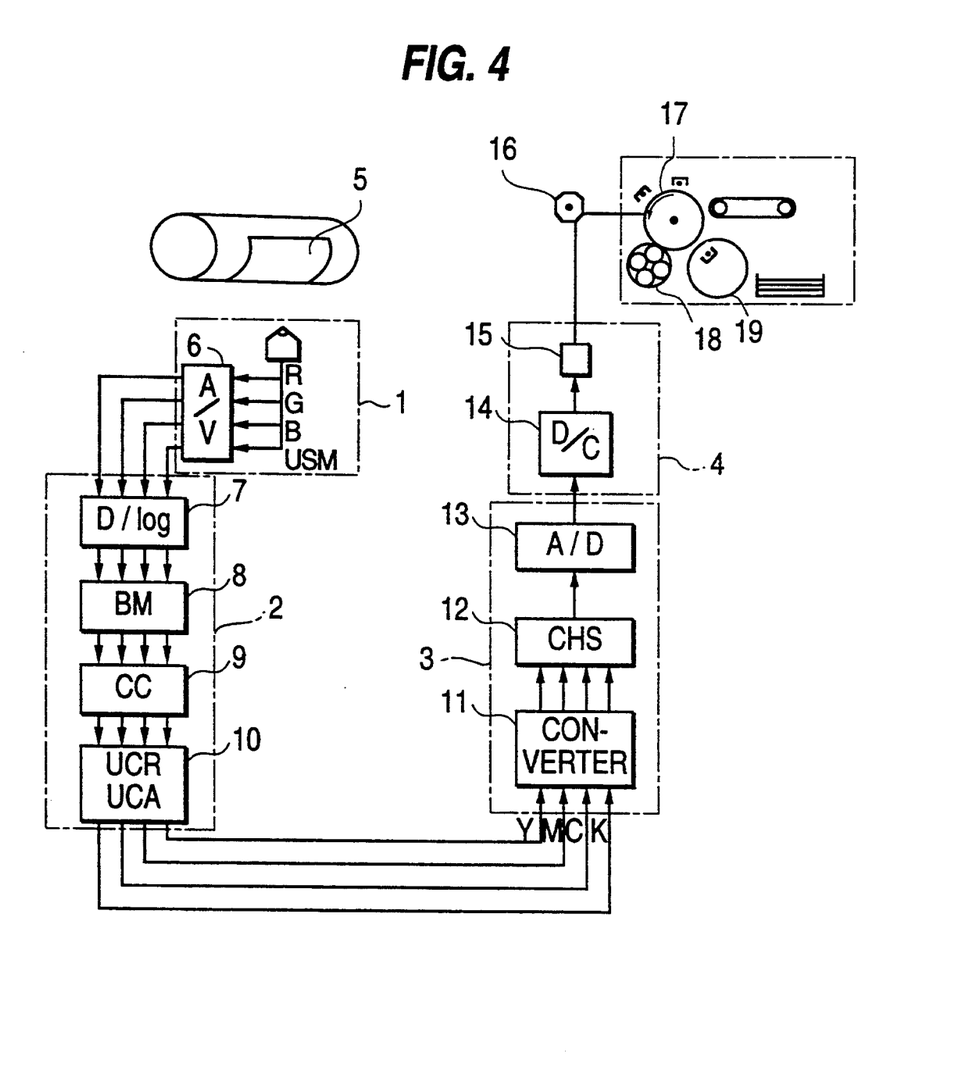
FIG. 4 is a schematic diagram showing a structure of a reproducing machine of a digital type (or a color copier) to which the tonal conversion method of a picture of this invention is applied.

Referring now to FIG. 4, wherein like reference characters designates like or corresponding parts in FIG. 3.

FIG. 4 shows a schematic illustration of a digital copier (or a color copier) employing a conventional laser beam, which has almost the same arrangement as the color scanner shown in FIG. 3.

As shown in FIG. 4, a photographic color original 5 is wound around a rotational cylinder. An original reading-out mechanism of a flat-bed type is of course, employable instead of the cylinder type.

The color copier includes a converting part 11 which incorporates an algorithm of the tonal conversion formula of this invention to operate the tonal conversion formula to determine tonal intensity values (y) of Y, M, C and K components as same as the color scanner shown in FIG. 3. The value y may be a value corresponding to the number of gradations, for example, 256 gradations in a reproduced picture. In the case of 256 gradations, $y_H=0$ and $y_S=255$ allow a reproduced picture of 0 to 255 (256) gradations in a dynamic range from a H to S area when conducting the tonal conversion formula.

The laser beam generated by a laser beam generator 15 is reflected by a polygon mirror 16 to form a latent image on a photosensitive material 17 on the basis of tonal intensity value (y) corresponding to a dot of a photographic plate, i.e., a proportion of pixels to be covered by ink in a predetermined pixel block. The latent image formed in the photosensitive material 17 is developed in the developing part 18, then transferred on a recording paper wound around a transfer cylinder 19.

The information relating to the proportion of an area of a pixel obtained in the converting part 11 is supplied to a color channel selector 12 which successively and selectively outputs ye', me', ce' and ke'. The outputs from the color channel selector 12 are converted from in analogue form into in a digital form and are supplied to an output part 4.

The output part 4 includes a dot controlling part 14 which controls operation of the laser beam generator 15 in response to the outputs of a tone controlling part 3.

The tonal conversion method of this invention is built in a tone controlling part as shown in FIGS. 3 and 4 of a system used to producing a reproduced picture, thereby rationalizing the tonal conversion work in the system.

DESCRIPTION OF PREFERRED EMBODIMENT

An embodiment of the present invention will be hereinafter described in detail.

A color film original, a color scanner and a color proofing method used in this embodiment were as follows:

(1) color film original:

A portrait of a woman taken with Fuji Chorme 100, 4"×5" (tradename) was used as an original picture.

The original picture was measured with X-RITE densitometer (tradename). The measured values were 0.31 and 2.72 in H and S areas, respective, density range (or dynamic range) of which were 2.41.

Since the density values measured in the H and S areas of the color photographic original were approximately the same those shown in Table 4 (a standard color photographic original). Therefore, Tables 4, 9 and 11 were referred to in this embodiment as data relating to a change in tone of a color plate picture which is outputs of a color scanner based on variations in density values of the H and S areas to be measured in a plate designing stage prior to conducting a color separation work, as data for a control of the density values measured in the H and S areas according to this invention, and as data of an effect to stabilize the tone of outputted color plate picture of the scanner by adjusting γ value in the tonal conversion formula.

(2) color scanner:

455 Digital Color Scanner manufacture by ISOMET was selected as a color scanner to perform color separation work and the following function were provided to the scanner:

(a) A density measuring part of the scanner was provided with a function to represent and output an average density value ($DH_{av}$) of the H area and an area in the vicinity thereof and an average density value ($DS_{av}$) of the S area and an area in the vicinity thereof.

In the scanner, the density is measured m times (m is an arbitrary integer). The measured density values are calculated to determine an average density value. The determined average density value is represented and outputted in a digital form. The density was measured five times in this embodiment.

(b) A tone converting part of the color scanner was equipped with a software to compute the tonal conversion formula of this invention to convert a light intensity value (regularized light intensity value) ($X_n$) determined from a density value ($D_n$) into a dot area % value (y).

The tone converting part was also equipped with a software used to automatically determine $\gamma$ value allowing a desired dot area % value, for example, 50% in an area corresponding to a desired light intensity value (or a density value). (c) color proofing:

A chromarine process was employed as a color proofing method after performing the color separation work by the color scanner. (d) color separation:

Two different operators, A and B, made an experiment on how much degree an effect is obtained when variations in density values measured in the H and S areas of the color film original is decreased, more specifically, how much degree an effect is obtained when each variation in the H and S areas falls within a range from 0.0200 to 0.0500, and how much degree an effect is obtained when a value of the coefficient $\gamma$ in the tonal conversion formula of this invention is varied, in addition to the former case.

Assigning the H and S areas on the color photographic original, a color separation work was so performed by the respective operators A and B that the respective operator A and B can make certain the effects in the former and the later case, respectively.

Conditions when conducting the tonal conversion formula of this invention to set color separation curves for C, M and Y plates were as follows:

C plate: $y_H \times 5\%$, $y_S = 95\%$;

M=Y plate: $y_H = 3\%$, $y_S = 90\%$;

$\gamma$ value: 0.45 (fixed) or voluntarily altered (referring to Tables 10 to 11).

The operator A used a scanner head of the color scanner and measured density values in the H and S areas 10 times each. The results are shown in Table 12. In Table 12, each density value shown is an average obtained through five times measurement. The results is shown in Table 12.

The operator B measured density values in the H and S areas five times each in the same manner as the operator A. The results are shown in Table 13.

TABLE 12

| DENSITY VALUES IN H AND S MEASURED BY A | | | |
|---|---|---|---|
| No. | H | S | note |
| 1 | 0.3060 | 2.7280 | data for a plate making design in the |
| 2 | 0.3020 | 2.7060 | case of No. 7 |
| 3 | 0.3080 | 2.7300 | 1) density range of color film original: |
| 4 | 0.3100 | 2.7320 | 0.3020–2.7060 = 2.4040 |

TABLE 12-continued

| DENSITY VALUES IN H AND S MEASURED BY A | | | |
|---|---|---|---|
| No. | H | S | note |
| 5 | 0.2940 | 2.7040 | 2) density value at ¼: 0.9030 |
| 6 | 0.3040 | 2.7160 | 3) light intensity value at ¼: 1.9021 |
| 7 | 0.3020 | 2.7060 | 4) regularlized light intensity value at |
| 8 | 0.2980 | 2.7040 | ¼: 0.3801 |
| 9 | 0.3040 | 2.7080 | 5) dot area % value of C plate at ¼: |
| 10 | 0.2980 | 2.6840 | 50.4104 |

TABLE 13

| DENSITY VALUES IN H AND S MEASURED BY B | | | |
|---|---|---|---|
| No. | H | S | note |
| 1 | 0.3020 | 2.7080 | data for a plate making design in the case |
| 2 | 0.3140 | 2.7280 | of No. 2 |
| 3 | 0.2960 | 2.6840 | 1) desnity range of color film original: |
| 4 | 0.3040 | 0.7160 | 2.4140 |
| 5 | 0.3040 | 2.7160 | 2) density value at ¼ (table 12, No. 7): 0.9030 |
| | | | 3) regularlized light intensity value at ¼: 0.3695 |
| | | | 4) dot area % value of C plate at ¼: 49.3713 |

As seen from Table 12, it is ascertained that variations in values of the H and S measured by the operator A fell within a range of 0.3100−0.2940=0.0160 and 2.73202−2,6840=0.0480, respectively. It is also ascertained that the values of the H area fell within a permitted range of 0.020 and the values of the S area also fell within a permitted range of 0.0500, as intended. The color separation work was carried out on the basis of the data shown in column No. 7 in Table 12, a result of which was satisfactory.

Next experiment was made on whether the same result as brought out in the color separation work ($\gamma$=0.45, fixed) on the basis of the data shown in column 7 in Table 12 is obtained when a color separation works was carried out, using the data shown in column 2 in Table 13, besides adjusting $\gamma$ value in the tonal conversion formula of this invention.

A reason that the data shown in column No. 2 in Table 13 was employed in this experiment is that said data is removed farthest from the data shown in column No. 7 in Table 12, which is the most suitable case when ascertaining the effect of this invention.

As shown in columns of note in Tables 12 and 13, when $\gamma$ value in the tonal conversion formula is 0.45, (a) a dot area % value for C plate at ¼ in the case of No. 7 by the operator A is 50.4104; and (b) a dot area % value for C plate at ¼ in the case of No. 2 by the operator B is 49.3713. The former value is different from the later case. Consequently, printed pictures in the former and later cases have different tones in a strict sense.

As such, the $\gamma$ value was changed from 0.45 to 0.4921 and a color separation work was carried out using the data shown in column No. 2 in Table 13. When $\gamma$=0.4921, a dot area % value for C plate at ¼ becomes 50.4089.

Comparing a color proofed printed picture produced by the operator A with a color proofed printed picture produced by the operator B, the both have approximately the same tone.

From the results of the experiments, it is known that the tonal conversion method according to this invention may give a predetermined effect to the printed pictures. Prior assignment of positions of the H and S area on the original picture allows to eliminate an inverse effect to the color plate picture outputted from the color scanner due to the variations in density values measured in the H and S areas, independent of the size, shape and dispersed state of the silver grains in the photographic photosensitive materials, and differences in working manner of the operators, whereby a stable tone (i.e., a gradation and a color tone) may be constantly provided to a color printed picture.

What is claimed is:

1. A tonal conversion method for converting a color photographic original picture of a continuous tone into a reproduced picture of a halftone, comprising the steps of:

using a scanner to scan the color photographic original picture to measure density values in a designated highlight area (H) and an area in the vicinity thereof of the color photographic original picture to obtain a representative density value ($DH_{av}$) of the highlight area (H) from the measured density values and to measure density values of a designated shadow area (S) and an area in the vicinity thereof of the color photographic original picture to obtain a representative density value ($DS_{av}$) of the shadow area (S) from the measured density values;

using the scanner to scan the color photographic original picture to measure density values ($D_n$) of pixels of a range of the color photographic original extending from the highlight area (H) to the shadow area (S);

converting the representative density values ($DH_{av}$, $DS_{av}$) and density values ($D_n$) of the pixels into picture information values ($X_n$) correlating with light intensity using a density characteristic curve of a photosensitive material of a color film with which the color photographic original was taken, the density characteristic curve being defined in a D-X orthogonal coordinate system of which vertical axis (i.e., D axis) represents density values and of which horizontal axis (i.e., X axis) represents picture information values correlating with light intensity;

converting the picture information values ($X_n$) correlating with light intensity into tonal intensity values (y) in accordance with the following tonal conversion formula:

$$y = y_H + (\alpha(1 - 10^{-k \cdot x})/(\alpha - \beta)) \cdot (y_s - y_H)$$

producing the reproduced picture of a halftone using the tonal intensity values (y);

where

X: a basic light intensity value shown by $X = (X_n - X_H)$, which is a difference between a picture information value ($X_n$) correlating to light intensity, which is obtained from a density value ($D_n$) of a given pixel (n point) through a density characteristic curve defined in the D-X orthogonal coordinate system and a picture information value ($X_H$) correlating with light intensity corresponding to a representative density value ($DH_{av}$) of the highlight area (H);

y: a tonal intensity value of a pixel in the reproduced picture, corresponding to a given pixel in the original picture;

$y_H$: a tonal intensity value set in prior to a highlight area (H) in the reproduced picture corresponding to the highlight area (H) in the original picture;

$y_S$: a tonal intensity value set in prior to a shadow area (S) in the reproduced picture corresponding to the shadow area (S) in the original picture;

α: a surface reflectance of a recording paper on which the reproduced picture is expressed;

β: a numerical value determined from $\beta = 10^{-\gamma}$;

K: a numerical value determined from $k = \gamma(X_S - X_H)$, wherein $X_S$ is a picture information value correlating with light intensity, obtained from a representative density value ($DS_{av}$) of the shadow area (S) through the density characteristic curve defined in the D-X orthogonal coordinate system; and γ: a given coefficient.

2. A tonal conversion according to claim 1, wherein each of the density characteristic curve is a photographic density characteristic curve showing a correlation of a degree of blackening (density D) of a photographic photosensitive material with logarithmic values of light exposure (E).

3. A tonal conversion method according to claim 1, wherein the vertical axis (D axis) of the D-X orthogonal coordinate system defining the density characteristic curves has the same scaling as the horizontal axis (X axis) of the same.

4. A tonal conversion method according to claim 1, wherein the picture information value (Xn) correlating with light intensity is a regularized light intensity value when a value of (i.e., a dynamic range of the picture information values correlating with light intensity) is adjusted to 1.0.

* * * * *